Patented May 22, 1934

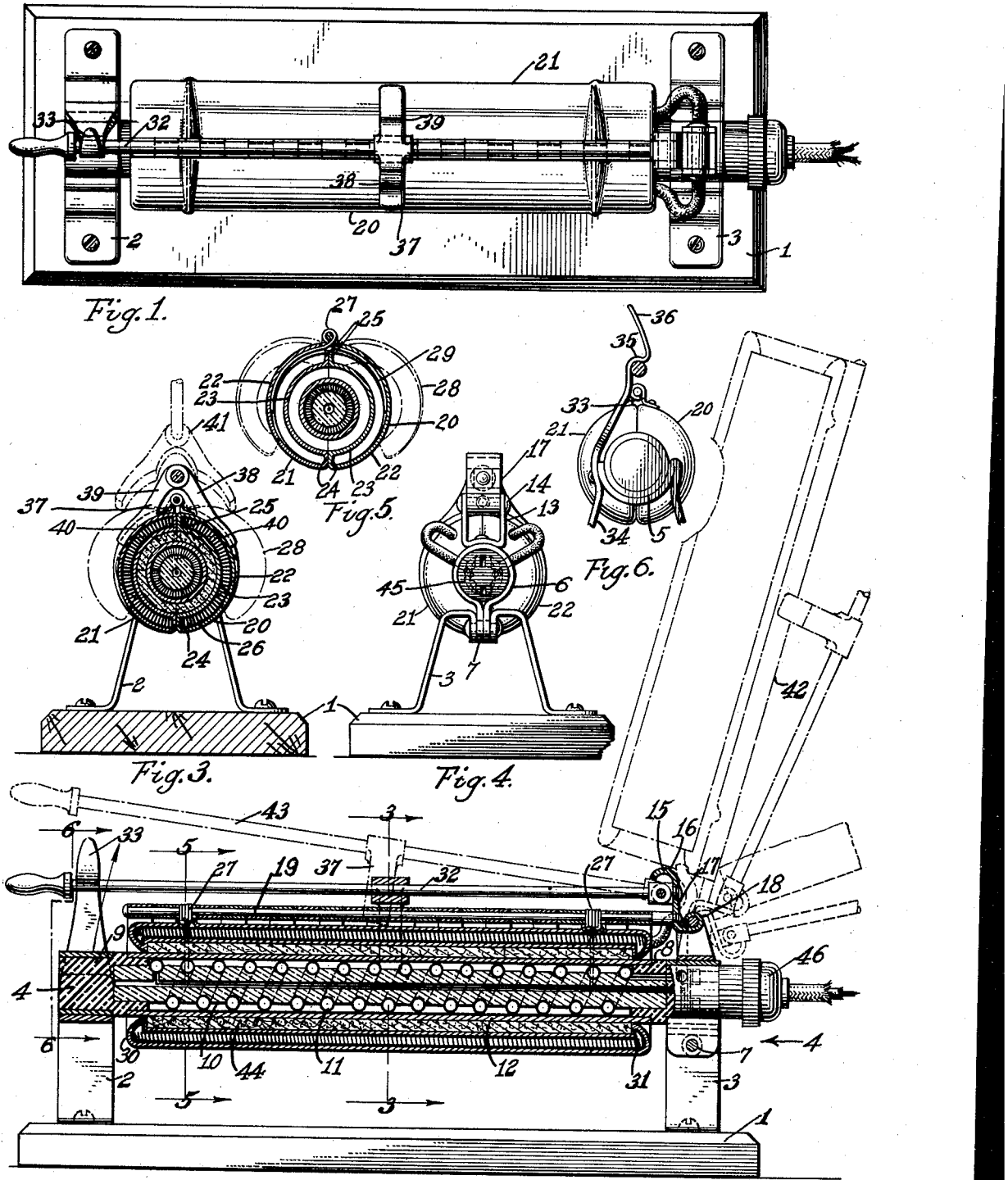

1,959,594

UNITED STATES PATENT OFFICE 1,959,594

COOKING UTENSIL

Thomas J. Matassa, Los Angeles, Calif.

Application April 14, 1931, Serial No. 529,947

3 Claims. (Cl. 107—66)

This invention relates to cooking utensils, and particularly to a type of cooking utensil which is adapted to be electrically heated for the purpose of baking some object.

More particularly, the invention contemplates the provision of a cooking utensil adapted to cook a dough in cylindrical form.

An object of the invention is the provision of a cooking utensil adapted to form dough and cook the same for the purpose of manufacturing cream rolls. A cream roll comprises a cake dough and a dough of some form which has been baked, and the said crust is then filled with whipped cream or flavored material of some character.

Another object of the invention is the provision of a cooking utensil which will rapidly bake an article in a given form.

Another object is the provision of a cooking utensil involving novel features of construction, which is inexpensive of manufacture, is easily operated, is so formed as to assure that the operator thereof will not be easily burned through handling the utensil, is sightly in appearance, efficient in operation, and superior to hand methods now utilized in the forming of dough into various shapes.

With the above and other objects in view, the invention consists in the novel and useful provision, formation, construction, association, and relative arrangement of parts, members and features, all as shown in certain embodiments in the accompanying drawing, described generally, and more specifically pointed out in the claims.

In the drawing:

Figure 1 is a top plan view of the improved cooking utensil,

Figure 2 is a longitudinal sectional view of the cooking utensil shown in Figure 1, Figure 3 is a sectional view on the line 3—3 of Figure 2, Figure 4 is an end elevation looking in the direction of the arrow 4 of Figure 2, the plug being removed, Figure 5 is a sectional view on the line 5—5 of Figure 2, and, Figure 6 is a sectional view on the line 6—6 of Figure 2.

Referring to the drawing, the improved cooking utensil includes a base 1 adapted to carry spaced supports or bracket members 2 and 3, which bracket members in turn support a central heating member 4. To this end, the bracket 2 is formed with a curved portion 5 (see Figure 6). The opposite bracket portion 3 is in hinged relation with a clamp 6 and which clamp encircles an end portion of the central heating member and is provided with two substantially parallel lugs 7, both provided with a through bore which, in conjunction with an aligned through bore in the bracket 3, forms a hinge when a pin is passed through said bores, as best illustrated in Figure 4. It will thus be seen that the central heating member may be swung upwardly from the curved support 5 of the bracket 2 or be maintained in position as illustrated in Figure 2. This central heating member includes end insulated members 8 and 9 which, in turn, are socketed to receive a core 10 around which is wound an electric heating element 11. Likewise extending between annular shouldered portions of the insulated end members and adapted to cover the coil 11 is a tubular member 12.

A U-shaped member 13 is mounted upon the clamp 6, and extending between the lugs of said U-shaped member is a pin 14. Extending between said lugs is a strap 15. This strap includes a curved extremity 16, a main body portion 17, and the usual knuckle portion 18 adapted to surround the pin 14. The main body portion 17 has secured thereto an elongated pin 19. What may be termed the outer heating member includes two half-circular portions 20 and 21, which are adapted to cooperate to spacedly surround the central heating member. Both outer heating members include two spaced curved wall portions 22 and 23, with end walls 24 and 25 between said curved wall portions, and between said curved wall portions is electrical heating wire 26. Both halves of the outer heating member are provided with knuckles which are alternately related and carried upon the pin 19. The general appearance is like a piano hinge. One or more spaced coil springs 27 surround the pin and are fastened between the halves of the outer heating element and in such a manner as to normally swing the halves apart as, for instance, illustrated in Figures 3 and 5 by the dotted line positions at 28. These coil springs are provided with ends of extended length for engagement with the casing halves, as shown at 29 in Figure 5 so that the halves are readily separated at the bottoms thereof. Obviously, the drop knuckle type is utilized so that this swinging apart may occur without binding. End portions of both halves of the outer heating member are flanged inwardly as shown at 30 and 31. Thus, when the two halves of the outer heating member are together, the said flanges will bear against the tubular member 12.

Secured to the body portion 17 of the strap 15 is a hinge adapted to secure a lever 32. This lever extends from this strap to and past the bracket 2 and the lever is adapted to be engaged by a releasable spring clip 33. This spring clip forms an extension of one leg 34 of the bracket 2, and said clip has an S-shaped or bent portion 35 for engagement with the lever and to be released from said lever when a finger portion 36 of said clip is moved to move the clip from the lever. Secured to this lever substantially centrally of its length is a saddle 37. This saddle includes two arms 38 and 39 both having curved foot portions 40, and which foot portions are adapted to engage the outer wall portions 22 and 23 of the outer heating member. This saddle when the lever 32 is engaged by the clip 33 holds the two wall portions closed or in such position as to completely encircle the central heating member. When the lever is released from the clip and the lever is moved to the dotted line position at 41, in Figure 3, this saddle is, of course, released from the halves of the outer heating member, so that the two halves may be actuated by the spring 27 to swing apart. When the lever 32 is moved upwardly a certain distance, it will engage the end of the curved member 16 of the strap 15 and further movement will completely lift the two halves of the outer heating member away from the central heating member, say to the dotted line position shown in Figure 2 at 42. When this occurs, the central heating member may be tipped upwardly away from the bracket 2.

The operation, uses and advantages of the invention just described are as follows:

If we assume that a dough is to be baked into tubular form, the lever plus the outer heating member is swung from the central heating member so that the central heating member can be readily contacted. The slab of dough is then placed upon the central heating member and particularly around the tubular member 12, whereupon the handle of the lever 32 is grasped and moved downwardly, carrying with it the two halves of the outer heating member. The two halves of the outer heating member will first be in the outwardly swung position, as indicated by the dotted lines 28 of Figures 3 and 5, and upon further downward movement of the handle member say from the dotted line position shown at 43 in Figure 2, the saddle or casing closing means 37 will force the two halves together to enclose the dough shown at 44 which has been placed around the central heating member. Ends of the dough will be sheared by the ends 30 and 31 of the halves of the outer heating member. Electrical connections are between a source of electric current supply and the coils 11 and 26. Consequently, the heating members will become hot and bake the dough, forming a crust. After the dough has been properly baked, the lever 32 may be released, whereupon the outer heating member halves will swing apart and further movement of the lever will swing the outer heating members to the dotted line position shown at 42, in Figure 2. The central heating member may then be swung upwardly and the formed cylindrical crust removed from said heating member. This crust may be filled with various materials, such as whipped cream, custards, and the like, to form the well known cream rolls.

An advantage of the present invention is that it allows the crust to be uniformly baked, one of the faults now prevalent when it is desired to make so-called cream rolls.

In the drawing, I have shown an end socket member 45 adapted to receive a plug 46, the plug communicating with a source of current supply.

The device contemplated by this invention is simple of manufacture, novel as to form, easily operated, and will produce superior results.

It is obvious that various changes and modifications and variations may be made in practicing the invention in departure from the particular showing of the drawing without departing from the true spirit of the invention.

I claim:

1. In a cooking utensil, an elongated central tubular heating element around which a dough is adapted to be placed to be baked, a pair of half round heating elements adapted to surround the elongated tubular heating element, hinge means between said half round heating elements, spring means normally urging said half round heating elements to simultaneously swing apart, and means adapted to engage both said half round heating elements to simultaneously close the same about the elongated tubular heating element, and whereby when the elongated heating element is hot the dough may be baked.

2. In a cooking utensil and base, a pair of spaced brackets carried by said base, an elongated tubular central heating element pivotally mounted to one of said brackets at one end thereof, the other end of said tubular heating element being supported upon the other of said brackets, a pair of hingedly related curved heating elements adapted to surround the central heating element, means urging said curved heating elements to separate, and releasable lever operated means for engagement with said curved heating elements to maintain the same closed about the central heating element.

3. In a cooking utensil, a tubular member around which a dough is adapted to be placed to be baked, a pair of half-round heating elements adapted to surround the tubular member, hinge means between said half-round heating elements, resilient means normally urging said half-round heating elements to simultaneously swing apart, and means adapted to engage both said half-round heating elements to simultaneously close the same about the tubular member.

THOMAS J. MATASSA.